US008538200B2

(12) United States Patent
Wang et al.

(10) Patent No.: US 8,538,200 B2
(45) Date of Patent: Sep. 17, 2013

(54) SYSTEMS AND METHODS FOR RESOLUTION-INVARIANT IMAGE REPRESENTATION

(75) Inventors: Jinjun Wang, San Jose, CA (US); Shenghuo Zhu, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 501 days.

(21) Appl. No.: 12/469,098

(22) Filed: May 20, 2009

(65) Prior Publication Data

US 2010/0124383 A1    May 20, 2010

Related U.S. Application Data

(60) Provisional application No. 61/115,953, filed on Nov. 19, 2008.

(51) Int. Cl.
*G06K 9/32* (2006.01)
(52) U.S. Cl.
USPC ........... 382/299; 345/582; 345/660; 382/115; 382/132; 382/194; 382/232; 382/236; 382/240; 382/261; 382/275; 382/284
(58) Field of Classification Search
None
See application file for complete search history.

(56) References Cited

U.S. PATENT DOCUMENTS

| | | | | |
|---|---|---|---|---|
| 5,477,272 A | * | 12/1995 | Zhang et al. | 375/240.06 |
| 5,859,920 A | * | 1/1999 | Daly et al. | 382/115 |
| 5,867,606 A | * | 2/1999 | Tretter | 382/261 |
| 6,026,183 A | * | 2/2000 | Talluri et al. | 382/194 |
| 6,239,807 B1 | * | 5/2001 | Bossut | 345/582 |
| 6,411,305 B1 | * | 6/2002 | Chui | 345/660 |
| 6,636,647 B1 | * | 10/2003 | Ohki et al. | 382/284 |
| 6,801,339 B1 | * | 10/2004 | Ito | 358/3.26 |
| 7,116,833 B2 | * | 10/2006 | Brower et al. | 382/240 |
| 7,512,283 B2 | * | 3/2009 | Brower et al. | 382/240 |
| 7,870,224 B1 | * | 1/2011 | Maigatter | 709/217 |
| 8,000,556 B2 | * | 8/2011 | Li et al. | 382/275 |
| 2002/0097439 A1 | * | 7/2002 | Braica | 358/3.26 |
| 2002/0172434 A1 | * | 11/2002 | Freeman et al. | 382/299 |
| 2003/0002582 A1 | * | 1/2003 | Obrador | 375/240.11 |
| 2003/0095155 A1 | * | 5/2003 | Johnson | 345/864 |
| 2004/0091158 A1 | * | 5/2004 | Miled et al. | 382/236 |
| 2006/0045357 A1 | * | 3/2006 | Schwartz et al. | 382/232 |
| 2006/0077470 A1 | * | 4/2006 | Saquib | 358/3.28 |
| 2007/0047833 A1 | * | 3/2007 | Zhang et al. | 382/274 |
| 2008/0232667 A1 | * | 9/2008 | Kitamura et al. | 382/132 |

OTHER PUBLICATIONS

Freeman et al, Learning Low-Level Vision, International Journal of Computer Vision 40(1), 25-47, 2000.
Capel et al, Super-resolution from multiple views using learnt image models, IEEE 2001.
Sun et al, Image Super-Resolution using Gradient Profile Prior, IEEE Conference on Computer Vision and Pattern Recognition, 2008. CVPR Jun. 2008.
Yang et al, Image Super-Resolution as Sparse Representation of Raw Image Patches, IEEE Conference on Computer Vision and Pattern Recognition, 2008. CVPR Jun. 2008.

\* cited by examiner

*Primary Examiner* — Tsung-Yin Tsai
(74) *Attorney, Agent, or Firm* — Akitaka Kimura; Joseph Kolodka (57) ABSTRACT

Systems and methods are disclosed for generating super resolution images by building a set of multi-resolution bases from one or more training images; estimating a sparse resolution-invariant representation of an image, and reconstructing one or more missing patches at any resolution level.

11 Claims, 7 Drawing Sheets

SYSTEMS AND METHODS FOR RESOLUTION-INVARIANT IMAGE REPRESENTATION

This application claims priority to U.S. Provisional Application Ser. No. 61/115,953, filed Nov. 19, 2008, the content of which is incorporated by reference.

BACKGROUND

This application relates to super resolution (SR) image construction from low resolution image(s).

Most of the visual data used by digital imaging and display devices are represented as raster image with a rectangular grid of pixels. Since images with higher pixel density are desirable in many applications, there is an increasing demand to acquire high resolution (HR) raster images from low resolution (LR) inputs such as images taken by cell phone cameras, or converting existing standard definition footage into high definition image materials. However, raster images are resolution dependent, and thus cannot scale to an arbitrary resolution without loss of apparent quality. The performance of simple interpolation methods is limited because they poorly recover the missing high-frequency components, and often blur the discontinuities of magnified images.

While the raster image representation is resolution dependent, vector image is a resolution-independent way to represent visual data digitally. The vector representation is scalable because it represents the visual data using geometrical primitives such as points, lines, curves, and shapes or polygon. This capability largely contrasts the deficiency of raster representation. The idea of automatically converting raster image into more scalable vector representation has been studied. However, vector-based techniques are limited in the visual complexity and robustness. For real images with fine texture or smooth shading, these approaches tend to produce over-segmented vector representations using a large number of irregular regions with flat colors. The discontinuity artifacts in region boundaries can be easily observed, and the over-smoothed texture regions make the scaled image watercolor like.

Images have been encoded using effective linear transforms. In this way the rich visual information can be encoded into the applied transformation, and the image is vectorized as the coefficients of a small set of bases of the transformation. In simple scenarios, pre-fixed transformations can be used, such as the BiLinear/BiCubic basis functions in 2-D image interpolation, and the DCT/DWT adopted in JPEG/JPEG-2000 standard, among others. Anisotropic bases such as countourlets have been explicitly proposed to capture different 2-D edge/texture patterns. These techniques usually lead to sparse representation which is very preferable in image/video compression. In addition to pre-fixed bases, since natural images typically contain many heterogeneous regions with significantly different geometric structures and/or statistical characteristics, adaptive mixture model representations were also reported. For example, the Bandelets model partitions an image into squared regions according to local geometric flows, and represents each region by warped wavelet bases; the primal sketch model detects the high entropy regions in the image through a sketching pursuit process, and encodes them with multiple Markov random fields. These adaptive representations capture the stochastic image generating process, therefore they are suited for image parsing, recognition and synthesis.

Simple interpolation methods cannot recover the missing high-frequency components and often blur the discontinuities of magnified images. The super-resolution (SR) approach reconstructs the high-resolution (HR) image by recovering additional information from multiple LR images using signal processing techniques. Existing SR methods can be divided into three major categories, specifically the functional-interpolation, the reconstruction-based and the learning-based methods. Comparing to other two categories, the learning-based methods are able to process single image input, and are more stable by using statistical learning technique, hence they have become a promising direction for the SR problem.

The learning-based methods solves the SR problem by learning the co-occurrence prior between HR and low-resolution (LR) image patches or coefficients, and processing the LR input along with appropriate smoothness constraint to generate HR image. However, in typical Learning-based image SR approaches, different models are built for different scale factors, and usually these models are not interchangeable. For example, the model computed for ×2 scale SR cannot be used for ×3 SR. These systems ignore the relation between models of different scales, hence large storage space and computation resources were wasted, and these techniques are quite limited in their applications.

SUMMARY

In one aspect, systems and methods are disclosed for generating super resolution images by generating a set of multi-resolution bases from one or more training images; estimating a sparse resolution-invariant representation of an input image; reconstructing the image with one or more missing patches at any resolution level including a super resolution level; and rendering the image at the predetermined resolution level.

Implementations of the above aspect may include one or more of the following. The process includes building a set of Resolution-Invariant Image Representation (RIIR) bases. The process can train the RIIR bases set and can apply the RIIR to an image with limited resolution to generate a new basis set at any scale on the fly. The process includes receiving a low resolution image and generating a high quality image. The multi-resolution bases can be an RIIR base set, where the process obtains a sparse resolution-invariant representation of an image patch at an input resolution given the RIIR base set. The process can reconstruct the image patch at any resolution level the resolution-invariant representation. The RIIR set can be used to learn a resolution-invariant representation. The image can be scaled to multiple resolutions using the resolution invariant representation. The image can be resized (magnified or shrunk) using only matrix-vector manipulation.

Advantages of the preferred embodiment may include one or more of the following. The optimal representations learned on any resolution level are resolution-invariant, such that they can be used to estimate the unknown patches at another resolution level. The reconstruction process requires only matrix-vector manipulation, hence it can be implemented efficiently, and thus have a wide application potential. Image magnification applications such as Multi-Scale Image Magnification, Continues Image Scaling, and Content-Base Automatic Zooming can be performed without requiring high performance processing power. The image representation is based on multi-resolution base set, therefore it is more scalable and interchangeable. The image representation is globally optimal with respect to the applied multi-resolution bases, hence the system provide better results in traditional SR problem. The image representation is resolution-invariant and can be used to scale the image to various scales by using respective resolution bases. This has obvious the importance in many resolution enhancement applications that existing method cannot handle well. With the multi-resolution RIIR set, the parameters used for any scale can also be used for another scale SR. Experimental results show that, in all the tested applications, the instant method outperforms existing methods in many aspects.

DESCRIPTION

Figure 1:
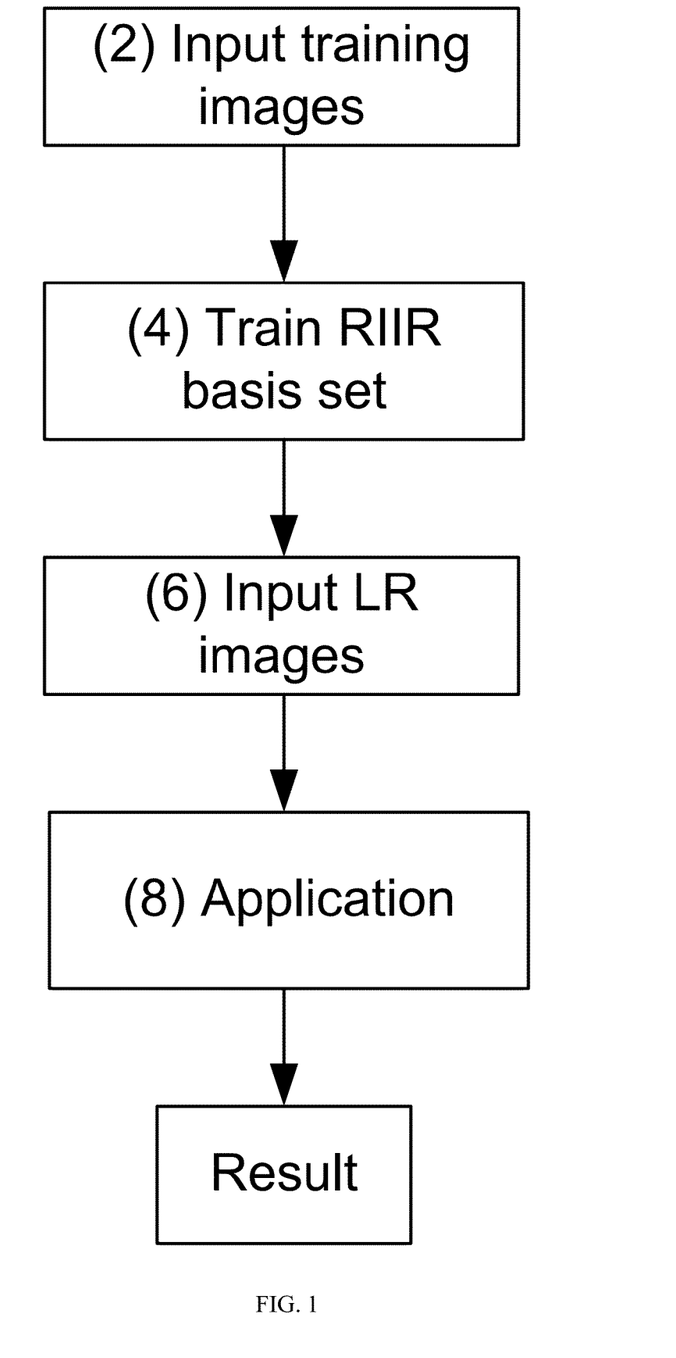
FIG. 1 shows an exemplary process to generate high quality images.

FIG. 1 shows an exemplary process to generate high quality images. The process uses a Resolution-Invariant Image Representation (RIIR) framework. The RIIR framework includes building a set of multi-resolution bases from training images, estimating the optimal sparse resolution-invariant representation of any image, and reconstructing the missing patches of any resolution level.

Turning now to FIG. 1, training images are received by the process in 2. Next, in 4, the process trains an RIIR basis set. After training, the process can receive low resolution images during operation in 6 and can generate high quality images as output for various applications in 8.

For example, in a first application, RIIR is used to perform Multi-Scale Image Magnification with a training strategy to built a compact RIIR set.

In a second application, the RIIR framework is extended to conduct Continuous Image Scaling where a new base at any resolution level can be generated using existing RIIRset on the fly.

In a third application, the RIIR framework is used in Content-Base Automatic Zooming applications. It is only necessary to process the image region inside the view port, hence the reconstruction process requires less computation than in the previous applications. This makes it very suitable for devices with limited CPU power, such as PDA, etc. As shown in the incorporated Provisional Application, experimental results show that in all these applications, the RIIR method outperforms existing methods in many aspects.

Figure 2:
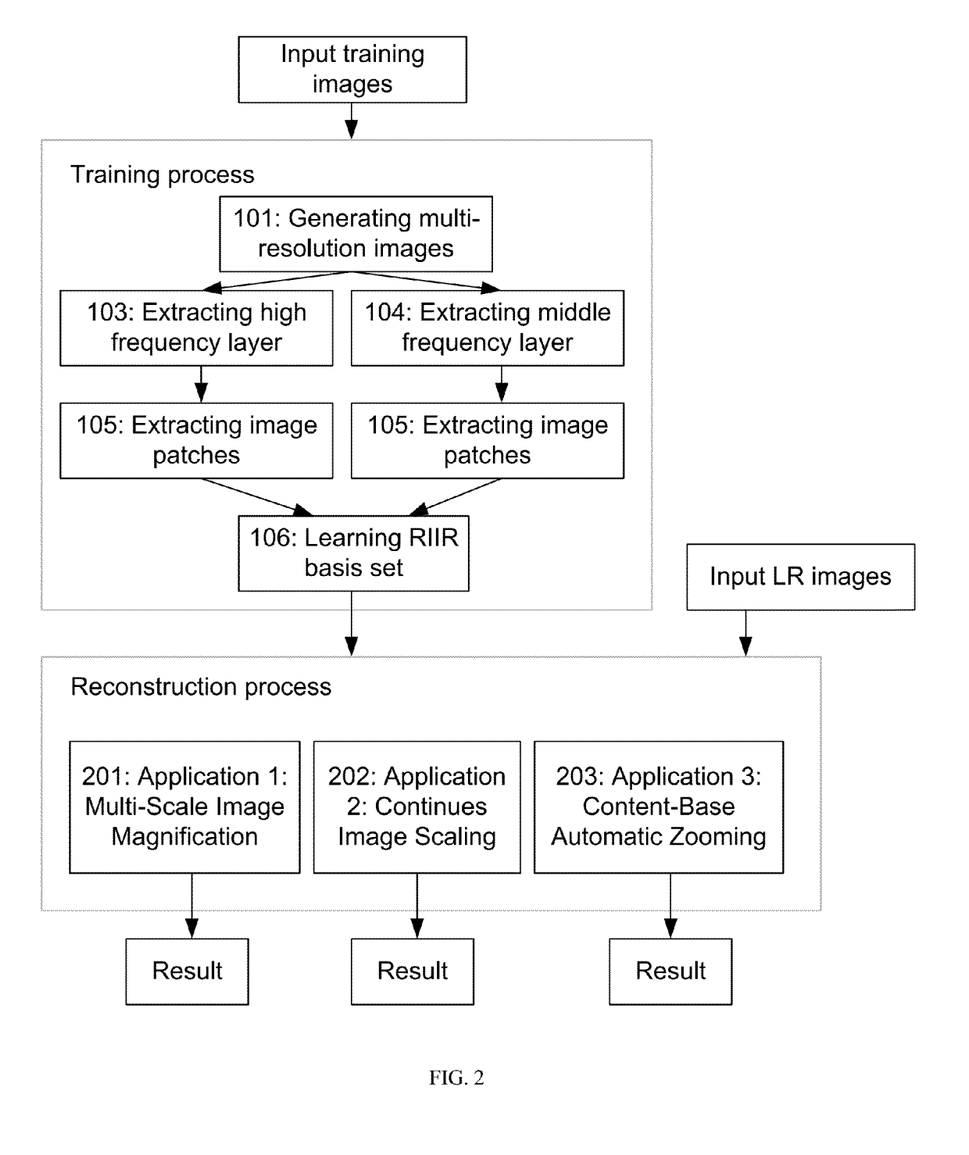
FIG. 2 shows in more detail one implementation of FIG. 1.

FIG. 2 shows in more detail one implementation of FIG. 1. The process of FIG. 2 uses a Resolution-Invariant Image Representation (RIIR) framework by utilizing the adaptive local representation. Instead of using orthonormal bases, such as X-lets or Fourier, the process takes advantage of the rich representative power of over-complete bases to represent images in sparse codes.

Figure 3:
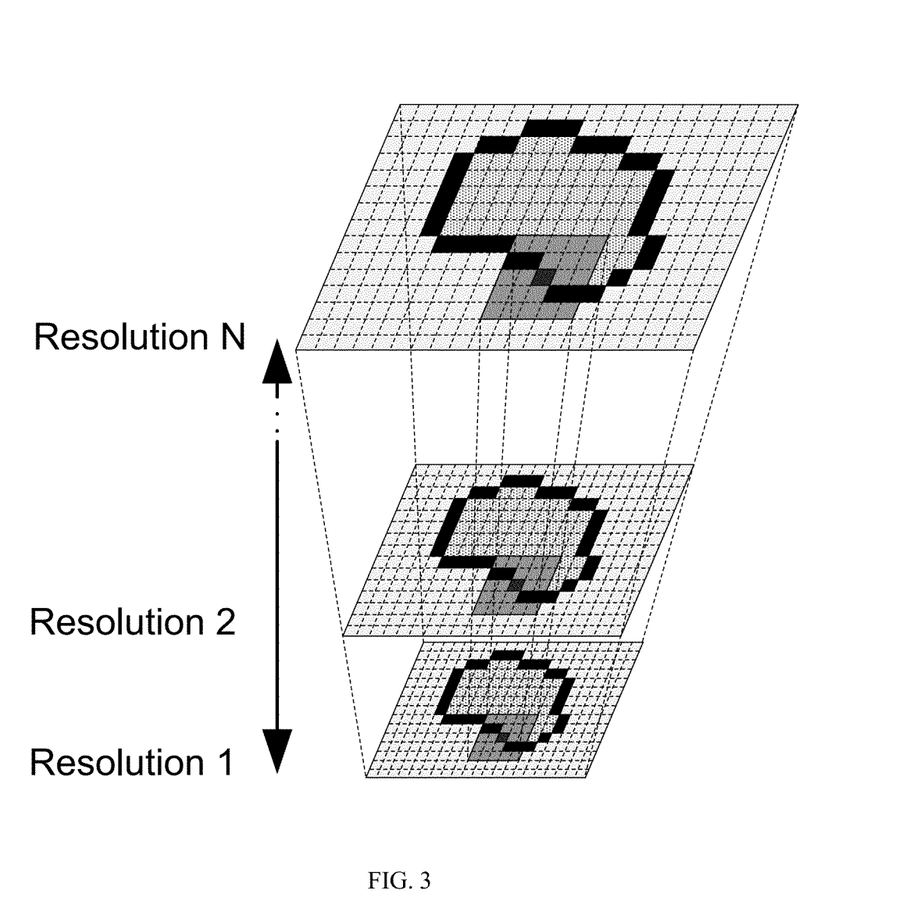
FIG. 3 shows exemplary multi-resolution images.

First, the process receives training images and is trained to generate a basis set. One exemplary process for generating the learning basis set is as follows:

input: $\{P_u^m, P_u^h\}$, u = 1,...,N,M,$\gamma$,c,$\tau$
output: $\{B_u^m, B_u^h\}$, u = 1,...,N
1: X ← M × N zero matrix, B ← $D_r^m$ × M random matrix, and o ← realmax.
2: repeat
3: $\quad o_{old} \leftarrow o$.
4: $\quad X(:,i) \leftarrow \operatorname{argmin}_x ||P_r^m(:,i) - Bx||^2 + \gamma|x|$
$\quad\quad \forall i = 1,...,N$.
5: $\quad B \leftarrow \operatorname{argmin}_B ||P_r^m - BX||^2$
$\quad\quad$ s.t. $\Sigma_j ||B(:,j)||^2 \leq c, \forall j = 1,...,M$.
6: $\quad o \leftarrow ||P_r^m - BX||^2 + \gamma \Sigma_i |X(:,i)|$.
7: until $(o_{old} - o)/o_{old} < 1_\epsilon - 4$
8: for u = 1 to N do
9: $\quad B_u^m \leftarrow \operatorname{argmin}_B ||P_u^m - BX||^2$
$\quad\quad$ s.t. $\Sigma_j ||B(:,j)||^2 \leq c, \forall j = 1,...,M$.
10: $\quad B_u^h \leftarrow \operatorname{argmin}_B ||P_u^h - BX||^2$
$\quad\quad$ s.t. $\Sigma_j ||B(:,j)||^2 \leq c, \forall j = 1,...,M$.
11: end for The process generates multi-resolution images in 101. As shown in FIG. 3, the input training image is the top-most image. Each lower resolution image is obtained by down-sample the top-most image to u/U scale, u=1, ..., U−1.

Referring back to FIG. 2, in 103, the process extracts high frequency layers and in 104, the process extracts the middle frequency layers. From 103 or 104, the process extracts image patches in 105. The extracted image patches are used to generate a learning RIIR basis set in 106.

During operation (reconstruction), the process receives a low resolution image as an input. The process generates a multi-scale image magnification (MSIM) of the low resolution image in 201. The image scaling is can be done as a Continues Image Scaling (CIS) in 202, or alternatively a content-based automatic zooming can be applied to the low resolution input image in 203. For MSIM, existing techniques compute the parameters at different scales individually, and construct the magnified image using respective model. In the system of FIG. 1, the parameters only need to be computed at any scale once and the multi-resolution RIIR set can be used to magnify the image to multiple using simple matrix-vector manipulation. For CIS, an additional advantage of the RIIR method is that, even if the trained multi-resolution RIIR set may only contain limited resolution scale, a new basis set at any scale, even if non-integer value, can be generated using the existing RIIR set on the fly. In this way the RIIR method can scale the image up to any scale. This is not possible for most existing SR technique. In content-based automatic zooming, for small display devices, an optimal scale factor can be determinate based on the image content, then with the RIIR method, the image can be zoomed with higher quality than currently state-of-art image interpolation method.

In one embodiment, a multi-resolution image patch pair set S is generated through the following steps: First, for each image I in a given dataset, the LR version Ī is obtained by first down-sampling I to 1/U scale, then up-sampling the image back to the original size. In this way the high frequency layer $I^h$ is discarded in Ī. N image patch pairs can be extracted from the $I^m$ and $I^h$ layers respectively, denoted as $S_U = \{S_U^m, S_U^h\} = \{p_{i,U}^m, p_{i,U}^h\}_{i=1}^N$. The subscript U is used to indicate that $S_U$ is from the $U^{th}$ resolution (I and $I_U$ are interchangeable thereafter).

Next, the embodiment obtains similar patch pair sets $\{S_1, ..., S_{U-1}\}$ but from different resolution version of I. To elaborate, for the $u^{th}$ set $S_u$, u=1, ..., U−1, the process shrinks I to u/U size (denoted as $I_u$), and down-samples $I_u$ to 1/u size then up-samples back to obtain $\bar{I}_u$. Then we can accordingly extract $S_u = \{S_u^m, S_u^h\} = \{p_{i,u}^m, p_{i,u}^m, p_{i,u}^h\}_{i=1}^N$. Note that the order of the base elements are specially arranged such that the $i^{th}$ pair in $\{S_u^m, S_u^h\}$ and the $i^{th}$ pair in $\{S_U^m, S_U^h\}$ are from patches at the same relative location.

An ideal image down-grading process to obtain $\bar{I}_u$ from $I_U$ can be modeled by $$\bar{I}_u = I_U \downarrow_u \otimes G_u^m,$$

where $\downarrow_u$ denotes the down-sample operator to u/U scale, and $G_u^m$ simulates a Gaussian blurring kernel to discard the high frequency layer. Then $$I_u^m = \bar{I}_u - \bar{I}_u \otimes G_u^l = I_U \downarrow_u \otimes G_u^m - I_U \downarrow_u \otimes G_u^m \otimes G_u^l,$$

where $G_u^l$ simulates a Gaussian blurring kernel to discard the middle frequency layer. If $P_u^m$ be an $D_u^m \times N$ matrix to represent all the elements in base $S_u^m$, where $D_u^m$ is the dimension of patch $p_u^m$, and $y_u^m$ be the middle frequency component of an input patch $y_u$, then $$P_u^m = P_U \downarrow_u \otimes G_u^m - P_U \downarrow_u \otimes G_u^m \otimes G_u^l,$$

and $$y_u^m = y_U \downarrow_u \otimes G_u^m - y_U \downarrow_u \otimes G_u^m \otimes G_u^l.$$

The optimal representation between $y_u^m$ and $P_u^m$ can be obtained by $$x_u^* = \mathrm{argmin}_{x_u} \|y_U - P_U x_u\|^2 + \gamma |x_u|,$$

The optimal representation $x_u^*$ is irrelevant of u. Hence the optimal representation x* is invariant across different resolution inputs given respective bases representing corresponding resolutions. Thus, if the different resolution versions of the same image are related, then the optimal representation learned from any resolution version can also be applied for another version. This is called the Resolution-Invariant Image Representation (RIIR) property, $X = \{x_j^*\}$ an RIIR, and the multi-resolution patch pair sets S an RIIRset. Through the RIIR property, the process of FIG. 1 saves the computational expensive SC process for multi-scale resolution enhancement task.

Figure 4:
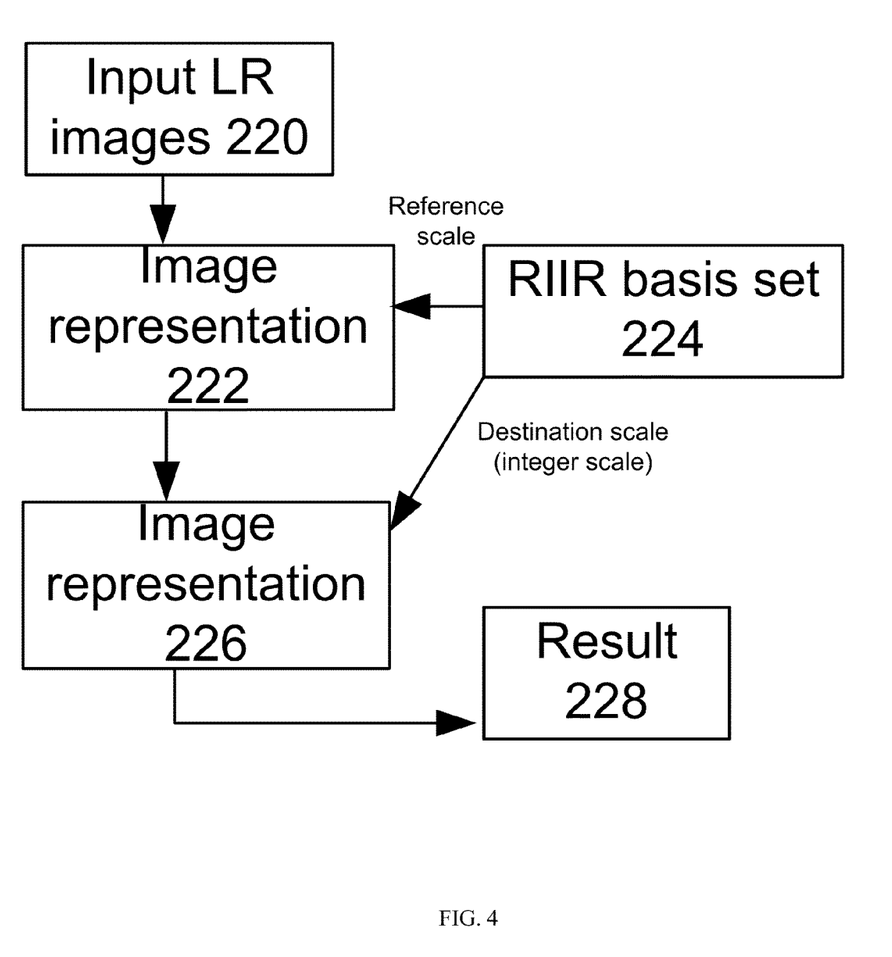
FIG. 4 shows an exemplary process in a Multi-Scale Image Magnification application.
Figure 5:
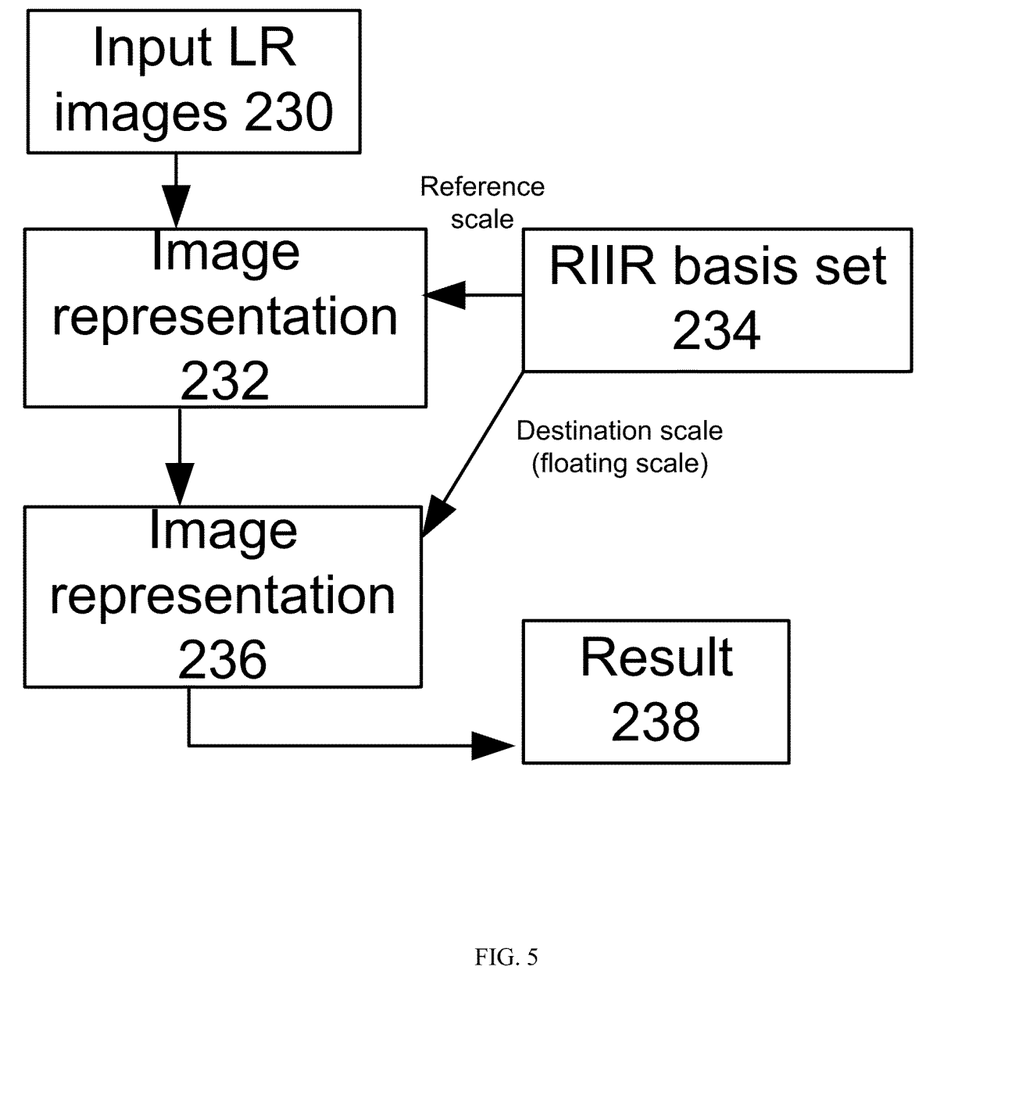
FIG. 5 shows an exemplary process in a Continuous Image Scaling application.

FIG. 4 shows an exemplary process in a Multi-Scale Image Magnification application. In the process of FIG. 5, the input low resolution images are received in 220. The image representation is generated with a reference scale in 222 using the RIIR basis set generated in 224. Another image representation is generated with an integer destination scale in 226 using the RIIR basis set generated in 224. The result is presented in 228.

There are many scenarios where users need different resolution image/video of a same object, viewing an image in a PDF document at different zooming, streaming videos over wireless channels to users with different receiver resolutions, etc. If the original image/video does not meet the resolution requirement, up-sampling methods such as BiCubic interpolation are usually adopted. Although numerous example-based image SR approaches have been reported to achieve better quality than simply 2-D image interpolation (Section 1), they cannot be easily applied for the Multi-Scale Image Magnification (MSIM) problem, because in typical example-based image SR approaches [9], different models are built for different scale factors, and usually these models are not interchangeable, the model computed for ×2 scale SR cannot be used for ×3 SR.

With the RIIR method, the MSIM problem can be solved. First, the RIIR X can be learned at any resolution level once. Then by applying different RIIRsets $S_u$, the same X can be used to magnify the image to multiple scales. Hence the testing set S created in previous section is able to do ×1:×5 SR. Finer magnification scales can be achieved by simply increasing the level of resolutions used in creating S. The advantage of the method is that, the magnification process requires only matrix-vector multiplication by Eq. (4), which can be implemented very efficiently. In addition, the RIIRset can be stored locally, and the computed RIIR can be transmitted together with the image/video document.

In 224, the process generates a suitable RIIR set that is both resolution-invariant and compact. The system generates a compact base set $\hat{S} = \{\hat{S}_u^m, \hat{S}_u^h\}_{u=1}^U$ to replace S. Each $\hat{S}_u^m$ or $\hat{S}_u^h$ contains M elements, and M<N. This is achieved by solving the following optimization problem, $$\mathrm{minimize}_{B,X} \|P_u^m - BX\|^2 + \gamma \sum_i |X(:,i)|$$

$$\mathrm{s.t.} \sum_j \|B(:,j)\|^2 \le c, \forall j = 1, \ldots, M,$$

where $P_u^m$ represents $\{p_{i,u}^m\}_{i=1}^N$, B is a $D^m \times M$ matrix representing $\hat{S}_u^m$, X is a M×N matrix representing X, and u indicates the resolution level used to learn the optimal representation. An iterative optimization process is applied to a random initialization of B. Then the process iteratively searches for the optimal sparse representations X based on the current values of B, and trains an optimal base B for the obtained X, until converge. Then X is fixed and u is changed between 1:U to train each $S_u$.

Figure 6:
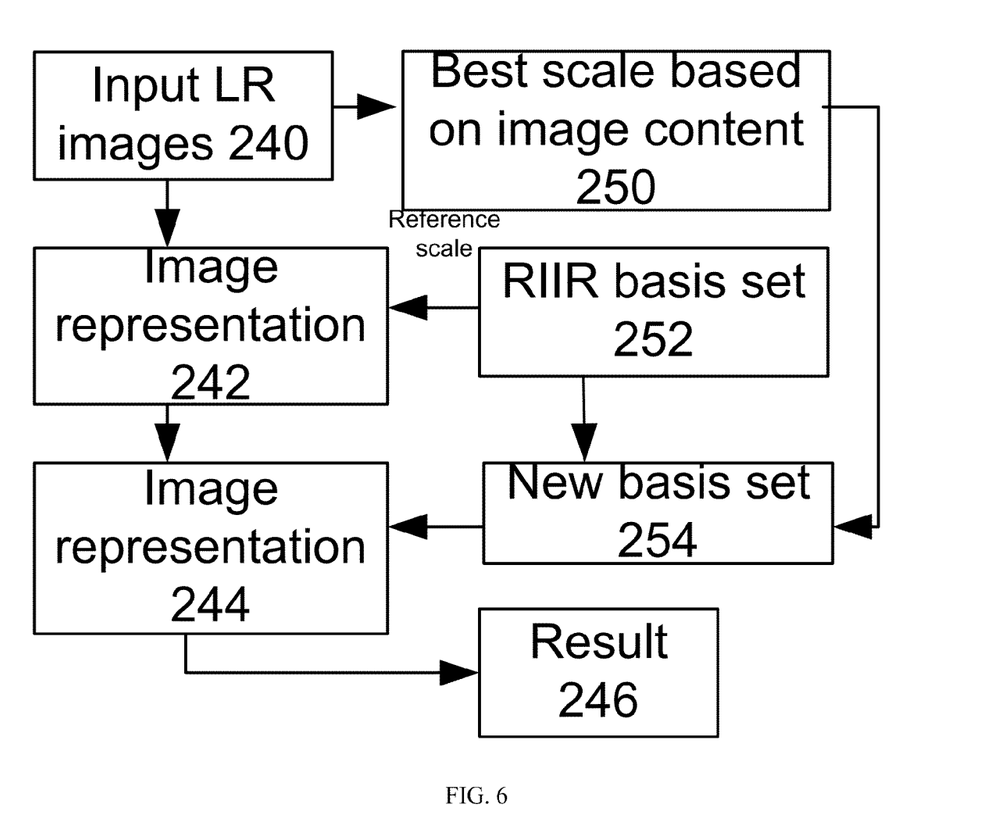
FIG. 6 shows an exemplary process in a Content-Based Automatic Zooming application.

FIG. 5 shows an exemplary process in a Continuous Image Scaling application. In the process of FIG. 6, the input low resolution images are received in 230. The image representation is generated with a reference scale in 232 using the RIIR basis set generated in 234. Another image representation is generated with a continuous or floating point destination scale in 236 using the RIIR basis set generated in 234. The result is presented in 238.

For CIS, with traditional example-based SR technique, the users have to store a continuous set of models, or at least at a very fine granularity, which requires a large storage space and computation power. With the RIIR method, the user only needs to store a limited scale of bases which can then be used to generate a new base at the required scale on the fly., from the $S = \{S_u\}_{u=1}^5$, a new base is generated at ×2.4 scale using $S_2$ and $S_3$. In one embodiment, if v be the target scale factor which is between u and u+1, the $i^{th}$ element in $S_v$ can be obtained by $$p_{i,v} = w_{u,v} \tilde{p}_{i,u} + (1 - w_{u,v}) \tilde{p}_{i,u+1},$$

where $\tilde{p}_{i,u}$ is the patch interpolated from scale u, and $\tilde{p}_{i,u+1}$ is interpolated from scale u+1. The weight $w_{u,v} = (1 + \exp((v-u-0.5)*\tau))^{-1}$ where in one implementation, $\tau = 10$.

Other applications can be used with RIIR in addition to MSIM and CIS. One such use is content based zooming. Viewing visual content on small display devices is a challenging and demanding application nowadays. Existing zoomable User Interfaces (UI) usually provide multiple fixed scales. Hence a typical viewing process is tedious because the user must manually scroll around the image and select different zoom by pressing the scroll and zoom buttons many times. Image Content-Based Automatic Zooming (CBAZ) provides improved viewing experience where zooming can be automatically performed as the user navigates. The optimal scale is determined based on the content in the viewport, complexity, degree of interest, distortion function, user attention, among others. In this way the viewing process becomes faster and less tedious because the display area is more effectively utilized.

FIG. 6 shows an exemplary process in a Content-Based Automatic Zooming application. In the process of FIG. 6, the input low resolution images are received in 230. The image representation is generated with a reference scale in 232 using the RIIR basis set generated in 234. Another image representation is generated with a continuous or floating point destination scale in 236 using the RIIR basis set generated in 234. The result is presented in 238.

The system of FIG. 6 properly scales the magnified image region. Since the image content factors are usually continuous, the optimal scale factor is also continuous. In one embodiment, the user navigates to the desired image region (highlighted by the center point in the rectangle region), and the optimal scale u is computed based on the content of the region. Then using the stored representations $\{x_j^*\}$ and $S_u$, the magnified image region can be generated. To speed up processing, only patches inside the highlighted region need to be estimated.

The RIIR can thus be used with a number of interesting applications: in the first application, we introduced a strategy to built a compact RIIR base set and applied the base set for Multi-Scale Image Magnification; in the second application, a new base at can be constructed any arbitrary scale from existing RIIR base set to allow Continuous Image Scaling; and in the third application, the image content-based zooming user interface is combined with the RIIR to perform Content-Based Automatic Zooming.

Figure 7:
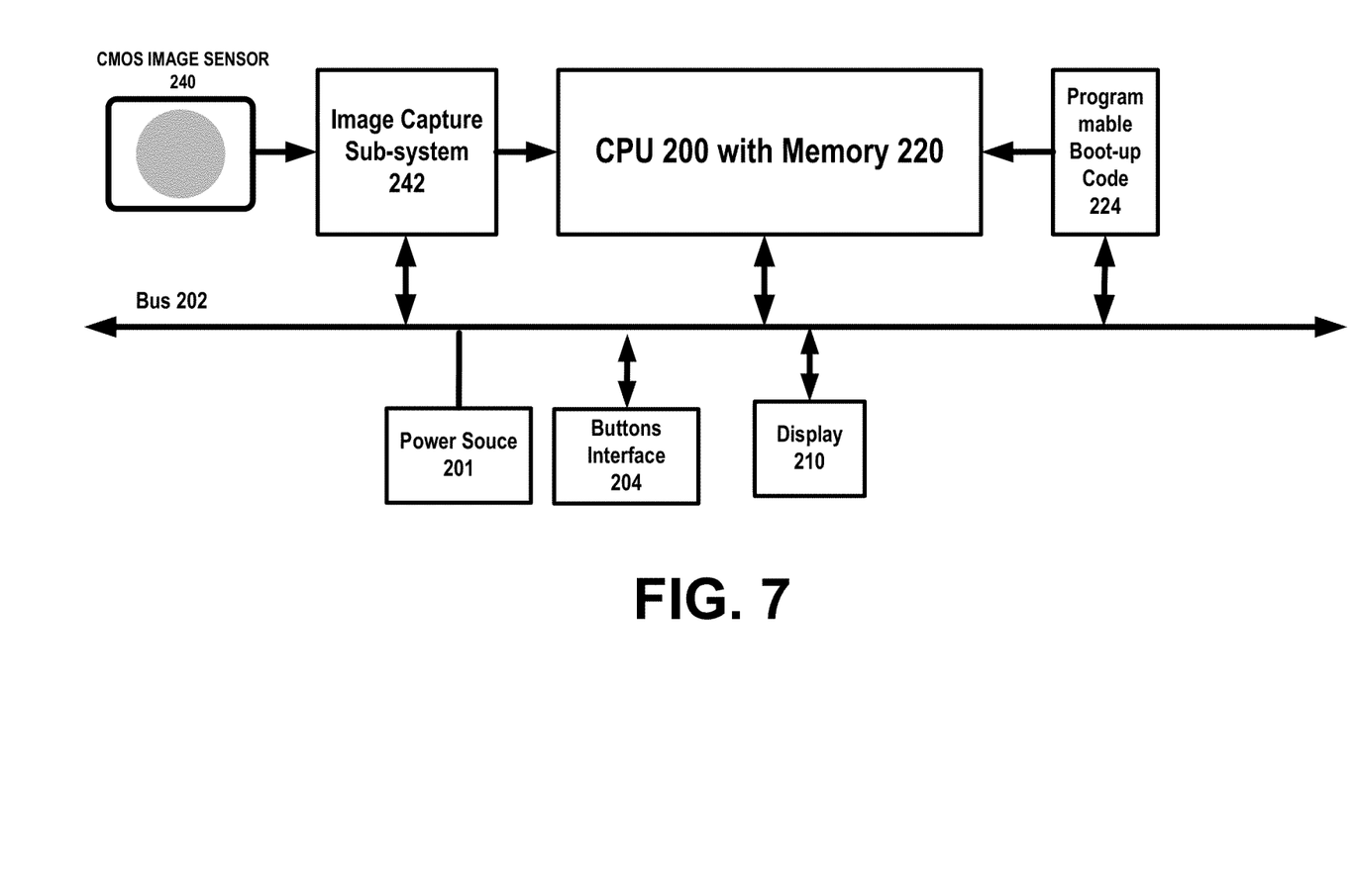
FIG. 7 shows an exemplary block diagram of processing electronics to capture and display images in super resolution in accordance with the process of FIG. 1 or FIG. 2.

FIG. 7 shows an exemplary block diagram of processing electronics to capture and display images in super resolution in accordance with the process of FIG. 1 or FIG. 2. The system of FIG. 7 can be part of a cell phone or a personal digital assistant or a camera or camcorder. A processor 200 controls all tasks done by the image capture system of FIG. 1. The processor 200 communicates over a bus 202 to various devices, including buttons interface 204, display 210. The processor 200 also communicates with embedded memory 220 and a programmable ROM 224 that contains boot code as well as application code. A rechargeable power source 201 such as a battery can be used to power the camera and processor. The CPU 200 is connected to an image capture sub system 242 which in turn is connected to an image sensor 240 which can be a CMOS sensor.

Although not discussed, the inventors contemplate applying the RIIR to improve image shrinking quality. Further, optimizations can be done to arrive at a more compact base set with uncompromised or improved reconstruction accuracy. Additionally, RIIR property can be used in other coding types such that the optimal representation may be learned faster, or requires less storage space for coding, streaming, personalization, or other applications.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer-implemented process to generate a super resolution image, the process comprising:
    generating a set of multi-resolution bases from one or more high-resolution training images, including extracting multiple high frequency layers and corresponding multiple middle frequency layers and extracting, from each frequency layer, image patches as bases to generate a learning Resolution-Invariant Image Representation (RIIR) basis set;
    receiving a low resolution image obtained by down-sampling the one or more training images;
    generating a multi-scale image magnification (MSIM) of the low resolution image;
    scaling the low resolution image either as Continuous Image Scaling (CIS) or via content-based automatic zooming;
    estimating a sparse resolution-invariant representation of an image at an original resolution;
    reconstructing the image with one or more missing patches at any resolution level including a super resolution level using the RIIR basis set; and
    rendering the image at the predetermined resolution level at the super resolution level higher than the original resolution.

2. The process of claim 1, further comprising:
    training the RIIR bases set.

3. The process of claim 1, further comprising:
applying the RIIR to an image with limited resolution to generate a new basis set at any scale on the fly.

4. The process of claim 1,
wherein the multi-resolution bases comprises the RIIR base set,
further comprising:
   obtaining a sparse resolution-invariant representation of an image patch at an reference resolution given the RIIR base set.

5. The process of claim 1, further comprising:
applying the RIIR set to learn a resolution invariant representation.

6. The process of claim 1, further comprising:
scaling the image to multiple resolutions using the resolution invariant representation.

7. The process of claim 1, further comprising:
resizing the image using only matrix-vector manipulation.

8. The process of claim 1, further comprising:
applying a fixed point destination scale factor.

9. The process of claim 1, further comprising:
applying a floating point destination scale factor.

10. The process of claim 1, further comprising:
determining a best scale based on an image content.

11. The process of claim 1, further comprising:
applying a reference scale to the RIIR basis set.

* * * * *